United States Patent
Han et al.

(10) Patent No.: US 9,760,411 B2
(45) Date of Patent: Sep. 12, 2017

(54) SWITCHING A LOCKING MODE OF AN OBJECT IN A MULTI-THREAD PROGRAM

(71) Applicant: International Business Machines Corporation, Armonk, NY (US)

(72) Inventors: Rui Bo Han, Beijing (CN); Wei Liu, Beijing (CN); Xue Fu Sha, Nanjing (CN); Bin Sun, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/333,414

(22) Filed: Oct. 25, 2016

(65) Prior Publication Data

US 2017/0039095 A1    Feb. 9, 2017

Related U.S. Application Data

(63) Continuation of application No. 14/023,564, filed on Sep. 11, 2013, now Pat. No. 9,495,224.

(30) Foreign Application Priority Data

Nov. 29, 2012  (CN) .......................... 2012 1 0500315

(51) Int. Cl.
*G06F 17/30* (2006.01)
*G06F 9/52* (2006.01)

(52) U.S. Cl.
CPC ........ *G06F 9/526* (2013.01); *G06F 17/30362* (2013.01)

(58) Field of Classification Search
CPC ....... G06F 17/30362; G06F 9/52; G06F 9/526
USPC ........................................................ 710/200
See application file for complete search history.

(56) References Cited

U.S. PATENT DOCUMENTS

| | | |
|---|---|---|
| 5,301,290 A | 4/1994 | Tetzlaff et al. |
| 5,414,839 A | 5/1995 | Joshi |
| 6,029,206 A | 2/2000 | Endicott et al. |
| 6,105,026 A | 8/2000 | Kruglikov et al. |
| 6,240,413 B1 | 5/2001 | Learmont |
| 6,883,026 B1 | 4/2005 | Onodera et al. |
| 7,236,974 B2 | 6/2007 | Bhattacharjee et al. |
| 7,383,369 B2 | 6/2008 | Siegwart |
| 7,496,574 B2 | 2/2009 | Walker |
| 7,574,438 B2 | 8/2009 | Cina |
| 7,975,271 B2 | 7/2011 | Anderson |
| 8,046,760 B2 | 10/2011 | Seidman et al. |
| 8,352,658 B2 | 1/2013 | Tarta et al. |

(Continued)

OTHER PUBLICATIONS

U.S. Appl. No. 14/023,564, 2 pages.

(Continued)

*Primary Examiner* — Brian Misiura
(74) *Attorney, Agent, or Firm* — Stephen R. Tkacs; Stephen J. Walder, Jr.; Lisa J. Ulrich (57) ABSTRACT

A mechanism is provided for switching a locking mode of an object in a multi-thread program. The mechanism acquires, during execution of the program, access information related to accesses to the object by a plurality of threads. The object supports a single-level locking mode and a multi-level locking mode. The single-level locking mode is a mode capable of locking the object. The multi-level locking mode is a mode capable of locking the object and fields in the object respectively. The mechanism switches the locking mode of the object between the single-level locking mode and the multi-level locking mode based on the access information.

20 Claims, 3 Drawing Sheets

(56) References Cited

U.S. PATENT DOCUMENTS

| | | |
|---|---|---|
| 8,458,150 B2 | 6/2013 | Holenstein et al. |
| 8,560,511 B1 | 10/2013 | Matthews et al. |
| 8,849,780 B2 | 9/2014 | Yospe et al. |
| 8,868,748 B2 | 10/2014 | Attaluri et al. |
| 2004/0205066 A1 | 10/2004 | Bhattacharjee et al. |
| 2004/0220933 A1 | 11/2004 | Walker |
| 2005/0125406 A1 | 6/2005 | Cina |
| 2005/0149634 A1 | 7/2005 | McKenney |
| 2007/0124546 A1 | 5/2007 | Blanchard et al. |
| 2007/0239915 A1 | 10/2007 | Saha et al. |
| 2011/0107340 A1 | 5/2011 | Gupta et al. |

OTHER PUBLICATIONS

Dragicevic, Kristijan et al., "Survey of Concurrent Priority Queue Algorithms", IPDPS 2008, International Symposium on Parallel and Distributed Processing, Apr. 14-18, 2008, http://www.zurich.ibm.corn/pdf/sys/adv__messaging/shortConcurrentPrioQueue.pdf, 7 pages.

Onodera, Tamiya et al., "A Study of Locking Objects with Bimodal Fields", IBM Corporation, IBM Research, Tokyo Research Laboratory, Oct. 1999, 15 pages.

Shen, Ting-Han et al., "Using Group Fine-grained Locking Scheme in Software Transactional Memory for Multiprocessing Systems", Institute of Computer Science and Information Engineering National Cheng Kung University, Tainan, Taiwan, 2010, 7 pages.

Sundell, Hakan et al., "Fast and Lock-Free Concurrent Priority Queues for Multi-Thread Systems", IPDPS 2003, International Symposium on Parallel and Distributed Processing, Apr. 22-26, 2003, https://docs.google.com/viewer?a=v&q=cache:vcnfHm6NQWYJ:citeseerx.ist.psu.edu/viewdoc/download?doi%3D10.1.1,66.6665%26rep%3Drep1%26type%3Dpdf+%22Fast+and+Lock-Fr.

SWITCHING A LOCKING MODE OF AN OBJECT IN A MULTI-THREAD PROGRAM

BACKGROUND

The present invention relates to locking of an object in a multi-thread program, and more specifically, to a method and system for switching a locking mode of an object in a multi-thread program.

With development of computer hardware technologies, multi-core chips on which several processor cores are integrated and processing systems using such multi-core chips, such as computers or the like, have been developed. Additionally, in order to speed up execution of a program, a Simultaneous Multi-Threading (SMT) technology was proposed, which renders that each processor core may support a plurality of threads. Therefore, one processing system may execute many threads simultaneously. In order to utilize a processing ability of such processing system, programs running on the processing system are also multi-threaded.

When a multi-thread program is executed, there are a plurality of threads simultaneously, which access various objects in the program, such as functions, statement blocks, data structures, or the like, according to needs, and release these objects when they are not used. A situation where multiple threads access a same object simultaneously (called contentious access hereinafter) may occur, thereby a collision occurs. To cope with the contentious access to the object, a locking mechanism may be applied to the object.

Conventionally, the locking mechanism applied to the object may be classified, according to a locking granularity, into a coarse-granularity locking mode and a fine-granularity locking mode, where the coarse-granularity locking mode is a mode of performing locking in a relatively coarse granularity of, for example, an object or the like, and the fine-granularity locking mode is a mode of performing locking in a relatively fine granularity of, for example, an field of the object or the like. According to a locking level, the locking mechanism applied to the object may be classified into a single-level locking mode and a multi-level locking mode, where the single-level locking mode is a mode of performing locking at one level, for example, a locking mode of performing locking at a level of an object, and the multi-level locking mode is a mode of performing locking at several levels, for example, a mode of performing locking at both the level of an object and the level of the filed of the object, respectively.

The following code segment 1 gives an example of an object (Class "MusicRack") which employs the single-level locking mode, where "Lock MusicRackLock" defines a lock for the object (object-level lock).

```
[Code segment 1]
    Class MusicRack{
        Lock MusicRackLock;
        int MusicCount; List topSelection;...
        List MusicTrack1;
        List MusicTrack2;   ...
    }
```

The following code segment 2 gives an example of an object (Class "MusicRack") which employs the multi-level locking mode, where "ReadWriteLock MusicRackLock" defines a lock for the object (object-level lock), and "Lock MusicTrack1Lock" and "Lock MusicTrack2Lock" define locks (field-level locks) for fields "List MusicTrack1" and "List MusicTrack2" of the object.

```
[Code segment 2]
    Class MusicRack{
        ReadWriteLock MusicRackLock;
        int MusicCount; List topSelection;...
        Lock MusicTrack1Lock;
        List MusicTrack1;
        Lock MusicTrack2Lock;
        List MusicTrack2;   ...
    }
```

Different locking modes may cause different performances. The single-level locking mode is easy to implement and has a short code path, and thus may enable a program to have a greater execution speed in an environment where there are few contentious accesses, but it has a low efficiency in an environment where the contentious accesses are relatively frequent due to its low parallelism degree. On the contrary, the multi-level locking mode may improve the parallelism degree by lowering the locking level, i.e. reducing a locking range, and thus may obtain a greater processing speed in the environment where the contentious accesses are relatively frequent, but it has a low efficiency in the environment where there are few contentious accesses, because it has a long code path and a deadlock problem may arise.

Conventionally, the locking mode of the object in the multi-thread program is set when the program is written, and when the program is executed, operations are performed according to the locking mode. However, different multi-thread programs have different runtime behaviors, thus the locking mode of the object in each program has to be designed according to an actual condition of the program, which renders the program design work to be very cumbersome. Additionally, it is very difficult to predict runtime behaviors of the multi-thread program, thus it is difficult to set a most suitable locking mode for the object therein at the time of design. Moreover, even for the same multi-thread program, its runtime behaviors vary dynamically, thus the locking mode set at the time of design may become inapplicable at different execution stages of the program.

SUMMARY

An object of the present invention is to provide a method and system that can switch a locking mode of an object in a multi-thread program, which are capable of switching the locking mode of the object in the program adaptively during execution of the program, to thereby improve execution efficiency and performance of the program.

According to an illustrative embodiment, there is provided a method for switching a locking mode of an object in a multi-thread program, comprising: acquiring, during execution of the program, access information related to accesses to the object by a plurality of threads, wherein the object supports a single-level locking mode and a multi-level locking mode, the single-level locking mode is a mode capable of locking the object, and the multi-level locking mode is a mode capable of locking the object and fields in the object respectively; and switching the locking mode of the object between the single-level locking mode and the multi-level locking mode based on the access information.

According to another illustrative embodiment, there is provided a system for switching a locking mode of an object in a multi-thread program, comprising: an access monitor configured to acquire, during execution of the program, access information related to accesses to the object by a plurality of threads, wherein the object supports a single-level locking mode and a multi-level locking mode, the single-level locking mode is a mode capable of locking the object, and the multi-level locking mode is a mode capable of locking the object and fields in the object respectively; and a locking mode controller configured to switch the locking mode of the object between the single-level locking mode and the multi-level locking mode based on the access information.

With the method and system according to the above aspects of the present invention, the locking mode of the object in the program may be adjusted adaptively according to a state of the multi-thread program during its execution (particularly, a level of contention for the object in the program by respective threads). Thus, it is unnecessary for a developer, when designing the program, to set the locking mode of the object by "guessing" runtime behaviors of the program, which simplifies program design work. Furthermore, by the adjustment, it is possible to set the object into the single-level locking mode to reduce a code path length when the level of contention for the object is low, and into the multi-level locking mode to increase a parallelism degree when the level of contention is high, so that the performance of the program is improved.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been shown. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
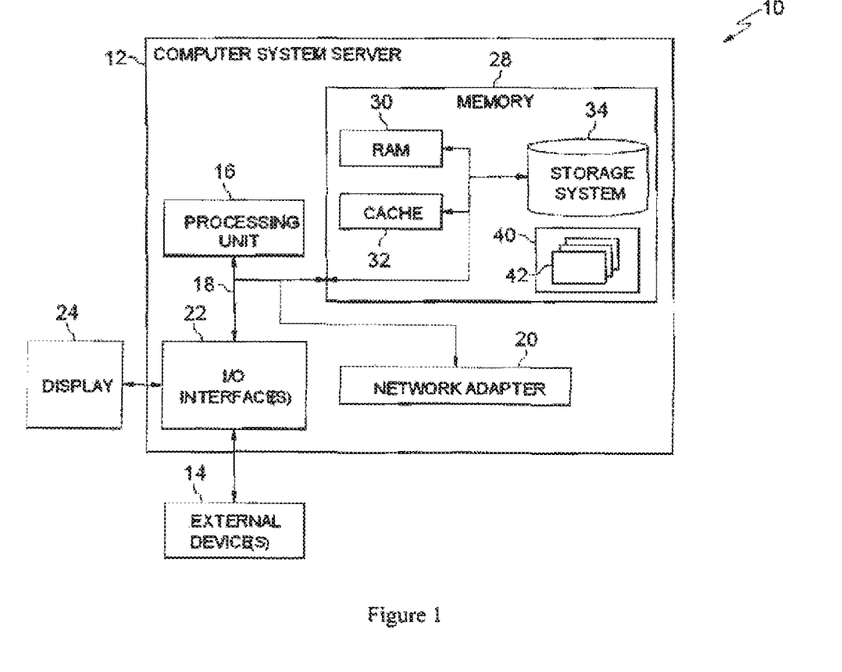
FIG. 1 shows a block diagram of an exemplary computer system/server 12 which is applicable to implement the embodiments of the present invention.

FIG. 1 shows an exemplary computer system/server 12 which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, a method and system for switching a locking mode of an object in a multi-thread program according to an embodiment of the present invention will be described with reference to drawings.

Firstly, an application background of the embodiment of the present invention is described.

As described above, a user, such as a developer, may define a plurality of objects when writing a multi-thread program, and each of the objects may comprise one or more fields, as shown in the above code segments 1 and 2. A locking mechanism may be applied to the object in order to cope with contentious accesses to the object in the program. Therefore, the user sets each of the objects into a single-level locking mode initially. The single-level locking mode may also be called an object-level locking mode, since it performs locking at a level of the object. For example, as shown in the code segment 3 below, an object-level lock (read-write lock) is defined by a lock definition statement "Readwrite-Lock object_level_lock", so that an object (Class "MusicRack") is set into the single-level locking mode.

[Code segment 3]

```
Class MusicRack{
    Read WriteLock object_level_lock=new ReadWriteLock( );
    List LeftMusicTrack=new List( );
    List RightMusicTrack=new List( );
}
```

Furthermore, in the embodiment of the present invention, the user may label an object to which contentious accesses may occur frequently during execution of the multi-thread program, that is, an object whose level of contention may be high (or called a hot object), among respective objects in the program by using a predetermined tag. For example, a primitive "@HOT OBJECT" may be used as the tag to label the hot object, as shown in the following code segment 4. It is to be appreciated that the object can also be labeled in other manners, as long as a compiler for compiling the program may recognize the labeled object. For example, other machine-recognizable tags, besides the above primitive, can be used to label the object.

[Code segment 4]

```
@HOT OBJECT
Class MusicRack{
    Read WriteLock object_level_lock=new ReadWriteLock( );
    List LeftMusicTrack=new List( );
    List RightMusicTrack=new List( );
}
```

After programming and labeling of the multi-thread program are completed, codes of the object in the program may be further amended, so that the object supports both the single-level locking mode and the multi-level locking mode. The single-level locking mode is a mode capable of locking the object, and the multi-level locking mode is a mode capable of locking the object and fields in the object, respectively. In the illustrative embodiment, the object may be each object (hot object) to which contentious accesses may occur frequently during execution of the program and which is labeled by the user as described above. In another embodiment, the object may be each object in the program.

In the illustrative embodiment, a definition of a lock for the object (i.e. a object-level lock performing locking at a level of the object) is included in the codes of the object as described above, thus the object can support the single-level locking mode. In order to make the object capable of supporting the multi-level locking mode, the codes of the object are needed to be amended so as to include definitions of locks for fields of the object (i.e. field-level locks performing locking at a level of the fields of the object), so that the object supports not only the object-level locking, but also the field-level locking, thereby supporting the multi-level locking. In particular, for each field of the object, a definition of a lock for the field is added in the codes. For example, for the example shown in the code segment 4, the object "MusicRack" can support not only the object-level locking for the object but also the field-level locking for the fields of the object, and thus can support the multi-level locking, by adding a definition "ReadWriteLock LeftMusicTrackLock" of a lock (read-write lock) for the field "LeftMusicTrack" and a definition "ReadWriteLock RightMusicTrackLock" of a lock (read-write lock) for the field "RightMusicTrack" into the code of the object, as shown in the code segment 5. It is to be noted that, since the object is set into the single-level locking mode initially, the added field-level lock(s) should not be activated, that is, should be set to "NULL", for example.

[Code segment 5]

```
Class MusicRack{
    ReadWriteLock object_level_lock=new ReadWriteLock( );
    ReadWriteLock LeftMusicTrackLock=Null;
    ReadWriteLock RightMusicTrackLock=Null;
    List LeftMusicTrack=new List( );
    List RightMusicTrack=new List( );
    Bool status=single_level_locking;
}
```

Moreover, it is preferable to add a locking state parameter for indicating a current locking state of the object to the codes of the object. The locking state parameter is set to a value indicating the current locking mode of the object. In the illustrative embodiment, because the object is set to the single-level locking mode initially, the locking state parameter is set to a value indicating the single-level locking mode. For example, as shown in the above code segment 5, a locking state parameter "status" is added to the codes of the object, and its value is set to single_level_locking so as to indicate the single-level locking mode.

It is to be appreciated that, although it is pointed out in the above that the definition of the lock for the object is added into the codes of the object in advance by the user, this is not limitative. The user may not add the definition of any lock, in which case the definition of the object-level lock for the object is further added in addition to amending the codes to add the definitions of the field-level locks in the manner described above, as shown by the definition "ReadWriteLock object_level_lock" in the code segment 5.

The illustrative embodiment is applicable for the multi-thread program amended as described above.

Hereinafter, a method for switching a locking mode of an object in a multi-thread program according to the embodiment of the present invention will be described with reference to FIG. 2.

Figure 2:
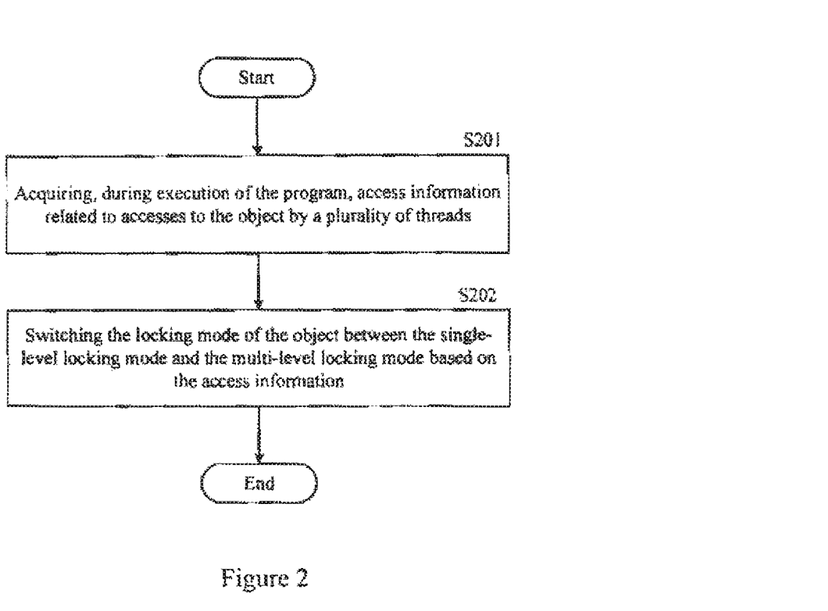
FIG. 2 shows a flow chart of a method for switching a locking mode of an object in a multi-thread program according to an embodiment of the present invention.

As shown in FIG. 2, in step S201, access information related to accesses to the object by a plurality of threads is acquired during execution of the multi-thread program. As described above, the object supports a single-level locking mode and a multi-level locking mode, the single-level locking mode is a mode capable of locking the object, and the multi-level locking mode is a mode capable of locking the object and fields in the objects, respectively.

Specifically, the multi-thread program may be executed by the processing system mentioned above, for example. During the execution of the program, the object in the program may be accessed by a plurality of threads sequentially, or may be accessed by the plurality of threads simultaneously, that is, be accessed contentiously. The access information recorded in Step S201 is information related to the accesses (including contentious accesses and non-contentious accesses) to the object by the respective threads and the contentious accesses. In the embodiment of the present invention, the access information may include a total number of accesses to the object and a number of contentious accesses to the object performed by the respective threads during the execution of the program, and a total waiting time of the respective threads that is a sum of waiting time of the respective threads requesting to access the object from the time when the respective threads start to wait because the object is locked to the time when they obtain an access right for the object.

Specifically, in order to record the information, three counters, i.e. an access counter Access_counter, a contention counter Contention_counter, and a total waiting time counter Total_time_counter, may be set for the object when execution of the program is started. Initial values of these three counters are set to 0.

During the execution of the program, the value of the contention counter Contention_counter is incremented by 1 each time a contentious access to the object occurs, in other words, each time it is detected that at least two threads simultaneously request to access the object, so that the counting value of the counter indicates a number of contentious accesses to the object by the respective threads. It is to be noted that in the case where the object is in the single-level locking mode, it is considered that one contentious access to the object occurs when at least two threads access the same object at the same time, and in a case where the object is in the multi-level locking mode, it is considered that one contentious access to the object occurs when at least two threads access a same field in the object at the same time.

The total waiting time counter Total_time_counter is used to record a sum of waiting time of the respective threads requesting to access the object from the time when the respective threads start to wait because the object is locked to the time when they obtain an access right for the object. Specifically, when a thread requests to access the object, but the object is locked, the thread has to wait until the object is unlocked and the thread acquires the access right for the object. In the illustrative embodiment, a time period from the time when the thread starts to wait to the time when it obtains the access right for the object is measured by, for example, a timer, as waiting time taken by the thread to access the object, and then the waiting time of the respective threads is added so that the sum of the waiting time of the respective threads may be obtained. In other words, the total waiting time of the respective threads for the object may be obtained by adding the waiting time of the respective threads to a current value of the total waiting time counter Total_time_counter.

Next, in step S202, the locking mode of the object is switched between the single-level locking mode and the multi-level locking mode based on the access information.

Briefly, it may be determined whether the contentious access to the object occurs frequently based on the access information acquired in step S201. When the contentious access to the object occurs frequently (that is, the level of contention for the object is high), the locking mode of the object is switched to the multi-level locking mode so as to increase a parallelism degree, while when the contentious access to the object does not occur frequently (that is, the level of contention for the object is low), the locking mode of the object is switched to the single-level locking mode so as to reduce a code path.

Specifically, firstly, a contention ratio for the object is calculated by the following Equation 1 according to the access information acquired in step S201, that is, according to the total number of accesses to the object by the respective threads, the number of contentious accesses to the object by the respective threads, and the total waiting time of the respective threads during the execution of the program, and an average waiting time for the object is calculated by the following Equation 2:

$$\text{Contention ratio} = \text{the number of contentious accesses}/\text{the total number of accesses} \quad \text{Equation 1}$$

$$\text{Average waiting time} = \text{total waiting time}/\text{the number of contentious accesses} \quad \text{Equation 2}$$

The contention ratio indicates a ratio of the contentious accesses in all of the accesses to the object. The greater the contention ratio is, the hotter the contention for the object is. The average waiting time indicates time that a thread has to wait for on average to acquire the access right for the object. The longer the average waiting time is, the hotter the contention for the object is.

Then, it is judged whether the locking mode of the object needs to be switched according to a predetermined criterion. For example, in the illustrative embodiment, when the object is in the single-level locking mode, the contention ratio of the object is greater than a first contention ratio threshold, and the average waiting time of the object exceeds a first time threshold, it may be determined that the level of contention for the object is too high, thus the locking mode of the object is switched to the multi-level locking mode; when the object is in the multi-level locking mode, the contention ratio of the object is lower than a second contention ratio threshold, and the average waiting time of the object is lower than a second time threshold, it may be determined that the level of contention for the object is too low, thus the locking mode of the object is switched to the single-level locking mode; and the locking mode of the object remains unchanged in other cases. The first and second contention ratio thresholds, and the first and second time thresholds may be set flexibly according to requirements; for example, the first contention ratio threshold may be set to 70%, the first time threshold may be set to 100 ms, the second contention ratio threshold may be set to 30%, and the second time threshold may be set to 30 ms. In another embodiment, only one group of thresholds may be set. For example, when the object is in the single-level locking mode, the contention ratio of the object is greater than a contention ratio threshold, and the average waiting time of the object exceeds a time threshold, the locking mode of the object is switched to the multi-level locking mode; when the object is in the multi-level locking mode, the contention ratio of the object is lower than the contention ratio threshold, and the average waiting time of the object is lower than the time threshold, the locking mode of the object is switched to the single-level locking mode; and the locking mode of the object remains unchanged in other cases. In a further embodiment, when the object is in the single-level locking mode, and the contention ratio of the object is greater than the first contention ratio threshold or the average waiting time of the object exceeds the first time threshold, the locking mode of the object may be switched to the multi-level locking mode; when the object is in the multi-level locking mode, the contention ratio of the object is lower than the second contention ratio threshold, and the average waiting time of the object is lower the second time threshold, the locking mode of the object may be switched to the single-level locking mode; and the locking mode of the object remains unchanged in other cases. In other words, the criterion may be set differently according to actual requirements. In addition, the current locking mode of the object may be judged according to the value of the locking state parameter set in the codes of the object as described above.

In the illustrative embodiment, step S202 may be performed periodically (for example, at a fixed interval) or in response to occurrence of a predetermined event, during the execution of the program. The predetermined event may be an event capable of reflecting whether the contentious accesses to the object in the program is too many/too few, for example, whether a CPU usage of a processing system executing the program is too high or too low, or the like.

Hereinafter, a method for switching the object from the single-level locking mode to the multi-level locking mode will be described with reference to FIG. 3.

Figure 3:
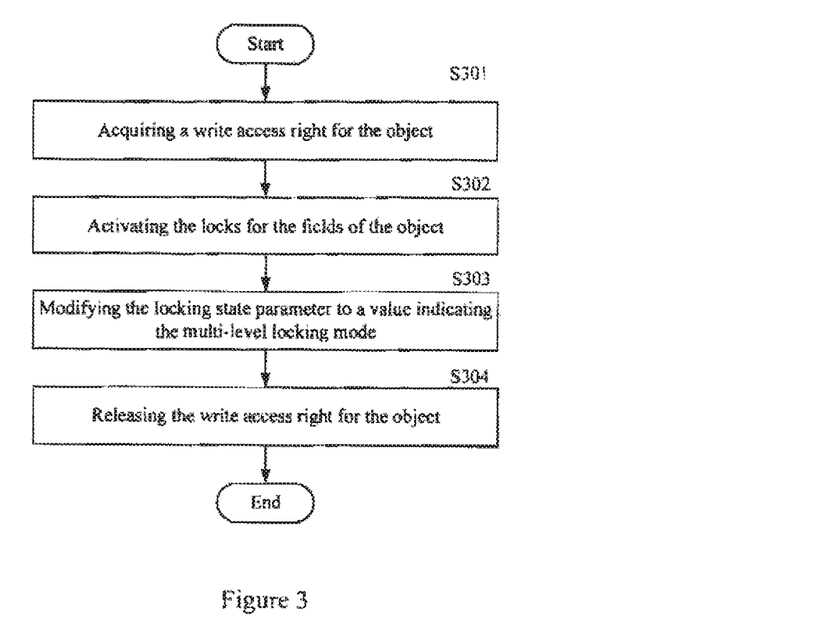
FIG. 3 shows a flow chart of a method for switching a locking mode of an object from a single-level locking mode to a multi-level locking mode according to an embodiment of the present invention.

As shown in FIG. 3, in step S301, a write access right for the object is acquired. Specifically, in a case where an object-level read-write lock is set for the object as shown in the code segment 5, a write lock (exclusive lock) of the object-level read-write lock is acquired. Thus, a right of modifying the codes of the object may be obtained, and it is guaranteed that the object cannot be accessed by other threads during the switching process.

Then, in step 302, the locks (field-level locks) set for the fields of the object in step S201 are activated. The field-level locks may be activated by initializing the field-level locks to lock instances of a read-write lock type, so that the locks set for the fields of the object become active. For example, in the example shown in the above code segment 5, the field-level locks may be activated by setting "ReadWriteLock LeftMusicTrackLock" to "new ReadWriteLock( )" and setting "ReadWriteLock RightMusicTrackLock" to "new ReadWriteLock( )".

Next, in step S303, the locking state parameter set in the codes of the object is modified to a value indicating the multi-level locking mode. For example, in the example shown in the code segment 5, the value of the locking state parameter "status" may be modified from "single_level_locking (single-level locking mode)" to "multiple_level_locking (multi-level locking mode)", so as to identify the object as the multi-level locking mode. At this time, because the locking mode of the object has been changed, the counters set for the object, that is, the access counter Access_counter, the contention counter Contention_counter and the total waiting time counter Total_time_counter, are further reset to 0 so as to recount in the new locking mode.

Finally, in step S304, the write access right for the object is released; in other words, the write lock in the object-level read-write lock of the object is released, so that other threads can access the object.

Thus, the locking mode of the object is switched from the single-level locking mode to the multi-level locking mode.

Hereinafter, a method for switching the object from the multi-level locking mode to the single-level locking mode will be described with reference to FIG. 4.

Figure 4:
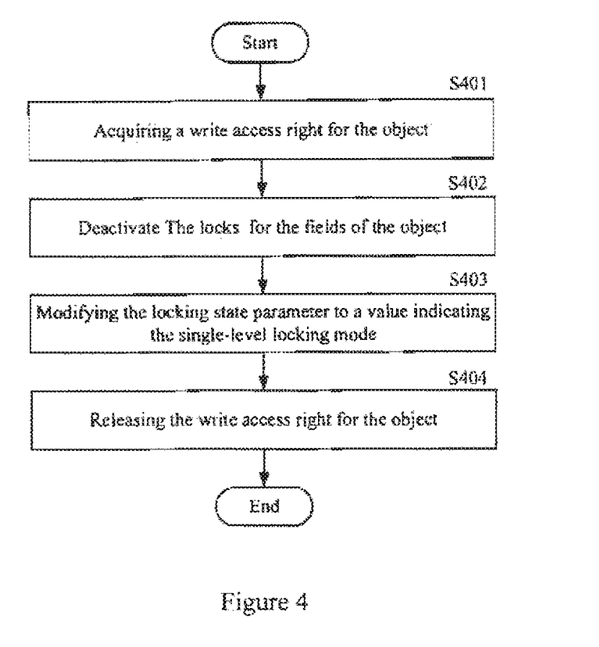
FIG. 4 shows a flow chart of a method for switching a locking mode of an object from a multi-level locking mode to a single-level locking mode according to an embodiment of the present invention.

As shown in FIG. 4, in step S401, a write access right for the object is acquired. As described above, in the example shown in the code segment 5, the write lock of the object-level read-write lock is acquired. Thus, the right of modifying the codes of the object may be obtained, and it is guaranteed that the object cannot be accessed by other threads during the switching process.

Then, in step S402, the locks (field-level locks) set for the fields of the object in the program are deactivated. For example, the field-level locks may be deactivated by setting the locks to Null, so that the field-level locks become inactive and only the object-level lock is active.

Next, in step S403, the locking state parameter set in the codes of the object is modified to a value indicating the single-level locking mode. For example, in the example shown in the code segment 5, the value of the locking state parameter "status" may be modified from "multiple_level_locking (multi-level locking mode)" to "single_level_locking (single-level locking mode)" so as to identify the object as the single-level locking mode. Likewise, because the locking mode of the object has been changed, the counters set for the object, that is, the access counter Access_counter, the contention counter Contention_counter and the total waiting time counter Total_time_counter, are further reset to 0 so as to recount in the new locking mode.

Finally, in step S404, the write access right for the object is released. This renders that other threads can access the object.

The above method according to the illustrative embodiment may be performed on each of the objects in the program or each of the objects labeled by the user in the program, so that the locking modes of the respective objects may be switched to optimal locking modes adaptively according to the situations of accesses to the objects by the respective threads during the execution of the program and/or a real-time workload of the processing system executing the program, and thereby the execution performance of the multi-thread application program is improved.

Therefore, it is unnecessary for the user (such as the program designer), when designing the program, to set the locking mode of the object by "guessing" runtime behaviors of the program; instead, he/she only needs to set the object simply into the single-level locking mode, which simplifies program design work. Moreover, the above operations of code modification and locking mode switching are transparent to the user and will not be perceived.

Thereafter, a system for switching a locking mode of an object in a multi-thread program according to an illustrative embodiment will be described with reference to FIG. 5.

Figure 5:
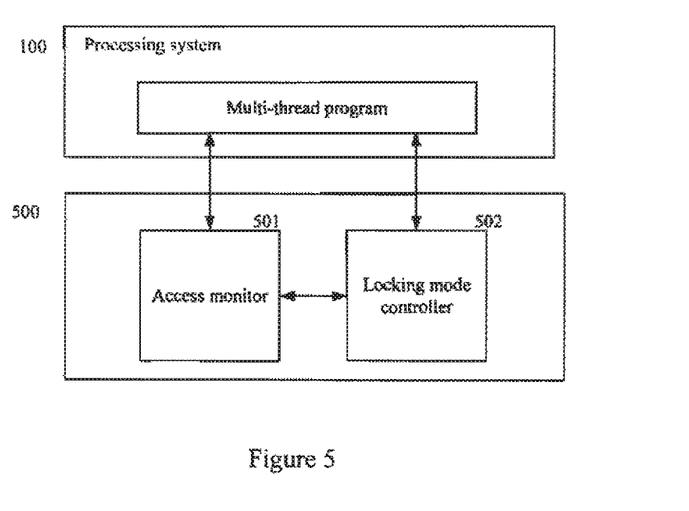
FIG. 5 schematically shows a block diagram of a system for switching a locking mode of an object in a multi-thread program according to an embodiment of the present invention.

As shown in FIG. 5, the system 500 according to the embodiment of the present invention comprises an access monitor 501 and a locking mode controller 502. The system 500 is operatively coupled to a processing system 100, and may perform the method described above with reference to FIGS. 2-4. The processing system 100 may be constituted by a multi-core chip and other necessary devices (not shown), such as a memory, an I/O interface, and the like, and may execute the multi-thread program written by the user.

As described above, the user may define a plurality of objects when writing the multi-thread program, and each object may further comprise one or more fields. Initially, the user sets each object into a single-level locking mode by setting a statement defining an object-level lock in the codes of the object. Furthermore, the user may label an object to which contentious accesses may occur frequently during execution of the multi-thread program, that is, an object whose level of contention may be high, among the respective objects in the program by using a predetermined tag. For example, a primitive "@HOT OBJECT" may be used as the tag to label such object, as shown in the above code segment 4, or such object can be labeled in other manners which are recognizable by a compiler (not shown). After completion of the writing of the program, the user may provide the program for the compiler. The compiler may be located inside or outside the system 500, for example, may be located in the processing system 100.

The compiler may further modify the codes of the object in the program, so that the object supports the single-level locking mode and the multi-level locking mode, where the single-level locking mode is a mode capable of locking the object, and the multi-level locking mode is a mode capable of locking the object and fields in the object, respectively. The object may be each object labeled by the user, or each object in the program. The compiler may recognize the labeled object by identifying the tag added by the user in the program.

Specifically, in the illustrative embodiment, when the user has added the definition of the lock for the object (the object-level lock) in the codes of the object, the compiler may further modify the codes of the object so as to add definitions of locks for the fields of the object (the field-level locks) therein, so that the object supports not only the object-level locking but also the field-level locking, and thus supports the multi-level locking. In another embodiment, when the definition of the object-level lock is not included in the codes of the object, the compiler may modify the codes of the object to add the definition of the object-level lock and the definitions of the field-level locks. The compiler may modify the codes of the object in the way described above, and details thereof are omitted here. It is to be noted that the added field-level locks should not be activated at this time, because the object is set to the single-level locking mode initially.

Moreover, the compiler preferably adds a locking state parameter for indicating a current locking state of the object into the codes of the object, and set the locking state parameter to a value indicating the current locking mode of the object. In the illustrative embodiment, because the object is set to the single-level locking mode initially, the compiler sets the locking state parameter to a value indicating the single-level locking mode.

After the compiler completes the modification of the multi-thread program, the processing system 100 may execute the program, during which a plurality of threads runs at the same time, and access the object in the program according to their respective requirements.

During the execution of the program, the access monitor 501 monitors the accesses (including contentious accesses and non-contentious accesses) to the object by the respective threads, acquires access information related to accesses to the object by the plurality of threads. As mentioned above, the object supports the single-level locking mode and the multi-level locking mode, where the single-level locking mode is a mode capable of locking the object, and the multi-level locking mode is a mode capable of locking the object and the fields in the objects, respectively. In the illustrative embodiment, the access information may include a total number of accesses to the object and a number of contentious accesses to the object performed by the respective threads during the execution of the program, and a total waiting time of all threads that is a sum of waiting time of the respective threads requesting to access the object from the time when the respective threads start to wait because the object is locked to the time when they obtain an access right for the object.

As described above, in order to record the information, the access monitor 501 may set three counters, i.e. an access counter Access_counter, a contention counter Contention_counter, and a total waiting time counter Total_time_counter, for the object when the execution of the program is started, and set initial values of these three counters to 0. For example, the access monitor 501 may set the counters in its own memory or in a memory of the processing system. The access counter Access_counter is used to count a total number of accesses to the object by the respective threads during the execution of the program. The contention counter Contention_counter is used to count a number of contentious accesses to the object by the respective threads during the execution of the program. The total waiting time counter Total_time_counter is used to record a sum of waiting time of the respective threads requesting to access the object from the time when the respective threads start to wait because the object is locked to the time when they obtain an access right for the object. These three counters are as same as those described above with reference to FIG. 2, and detailed descriptions thereof are omitted herein.

The locking mode controller 502 switches a locking mode of the object between the single-level locking mode and the multi-level locking mode based on the access information acquired by the access monitor 501.

Specifically, firstly the locking mode controller 502 calculates a contention ratio and average waiting time of the object by using the above Equations 1 and 2, according to the access information, that is, according to the total number of accesses to the object by the respective threads, the number of contentious accesses to the object by the respective threads, and the total waiting time of the respective threads during the execution of the program, and then judges whether the locking mode of the object needs to be switched according to a predetermined criterion. For example, in the illustrative embodiment, when the object is in the single-level locking mode, the contention ratio of the object is greater than a first contention ratio threshold, and the average waiting time of the object exceeds a first time threshold, the locking mode controller 502 may switch the locking mode of the object to the multi-level locking mode; when the object is in the multi-level locking mode, the contention ratio of the object is lower than a second contention ratio threshold, and the average waiting time of the object is lower than a second time threshold, the locking mode controller 502 may switch the locking mode of the object the single-level locking mode; and the locking mode controller 502 may keep the locking mode of the object unchanged in other cases. The first and second contention ratio thresholds, and the first and second time thresholds may be set flexibly according to requirements. In another embodiment, when the object is in the single-level locking mode, the contention ratio of the object is greater than a contention ratio threshold, and the average waiting time of the object exceeds a time threshold, the locking mode controller 502 may switch the locking mode of the object to the multi-level locking mode; when the object is in the multi-level locking mode, the contention ratio of the object is lower than the contention ratio threshold, and the average waiting time of the object is lower than the time threshold, the locking mode controller 502 may switch the locking mode of the object to the single-level locking mode; and the locking mode controller 502 may keep the locking mode of the object unchanged in other cases. In a further embodiment, when the object is in the single-level locking mode, and the contention ratio of the object is greater than the first contention ratio threshold or the average waiting time of the object exceeds the first time threshold, the locking mode controller 502 may switch the locking mode of the object to the multi-level locking mode; when the object is in the multi-level locking mode, the contention ratio of the object is lower than the second contention ratio threshold, and the average waiting time of the object is lower the second time threshold, the locking mode controller 502 may switch the locking mode of the object to the single-level locking mode; and the locking mode controller 502 may keep the locking mode of the object remains unchanged in other cases. The locking mode controller 502 may judge the current locking mode of the object according to the value of the locking state parameter. Additionally, the criterion for judging whether the locking mode of the object needs to be changed according to actual requirements.

In the illustrative embodiment, the locking mode controller 502 may perform the above operation periodically or in response to occurrence of a predetermined event, during the execution of the program. For example, the predetermined event may be set flexibly according to the actual requirements of the processing system and/or application; for example, the predetermined event may be that a CPU usage of the processing system 100 is too high or too low, or the like.

The locking mode controller 502 may realize the switching of the locking mode in the following manner.

In a case where the object is switched from the single-level locking mode to the multi-level locking mode, the locking mode controller 502 may acquire a write access right for the object firstly, so that the codes of the object may be modified and the object can not be accessed by other threads during the switching process. Then, in the manner described above, the locking mode controller 502 may activate the locks (field-level locks) for the fields of the object set by the user in the codes of the object. Next, the locking mode controller 502 modifies the locking state parameter set in the codes of the object to a value indicating the multi-level locking mode. Subsequently, the locking mode controller 502 may reset the above counters set for the object to 0 so that they recount in the new locking mode. Finally, the locking mode controller 502 releases the write access right for the object, so that other threads can access the object.

In a case where the object is switched from the multi-level locking mode to the single-level locking mode, the locking mode controller 502 may acquire a write access right for the object firstly, and deactivate the locks (field-level locks) set for the fields of the object in the program. The locking mode controller 502 may deactivate the locks in the manner described above. Next, the locking mode controller 502 modifies the locking state parameter set in the codes of the object to a value indicating the single-level locking mode, and then resets the above counters set for the object to 0 so that they recount in the new locking mode. Finally, the locking mode controller 502 releases the write access right for the object, so that other threads can access the object.

The system 500 may perform the above operations on each of the objects in the program or each of the objects labeled by the user in the program, so that the locking modes of the respective objects may be switched to optimal locking modes adaptively according to the actual situations at the time when the program is executed, thereby the execution performance of the multi-thread application program is improved. Thus, it is unnecessary for the user, when designing the program, to set the locking mode of the object by "guessing" runtime behaviors of the program, which simplifies program design work.

The method and system for switching a locking mode of an object in a multi-thread program according to the illustrative embodiments have been described above, and it is to be noted that they are only illustrative, not limitative. For example, it is mentioned in the above that the user sets the object into the single-level locking mode initially when wiring the program, but this is not limitative. The object may also be set into the multi-level locking mode, and its locking mode may be switched adaptively by the above method and system. In addition, the field-level locks may be set for only a part of the fields in the object, instead of all of the fields in the object, when the codes of the object are modified.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for switching a locking mode of an object in a multi-thread program, comprising:
    acquiring, during execution of the program, access information related to accesses to the object by a plurality of threads, wherein the object supports a single-level locking mode and a multi-level locking mode, the single-level locking mode is a mode capable of locking the object, and the multi-level locking mode is a mode capable of locking the object and fields in the object respectively, wherein the access information comprises a total number of accesses to the object by the plurality of threads, a number of contentious accesses to the object by the plurality of threads, and a total waiting time of the plurality of threads, the total waiting time being a sum of waiting time of the respective threads requesting to access the object from the time the respective threads start to wait because the object is locked to the time the respective threads obtain an access right for the object; and
    switching the locking mode of the object between the single-level locking mode and the multi-level locking mode based on the access information.

2. A method as claimed in claim 1, wherein the object is an object labeled in advance in the multi-thread program.

3. A method as claimed in claim 1, wherein switching the locking mode of the object between the single-level locking mode and the multi-level locking mode based on the access information comprises:
    calculating a contention ratio and average waiting time of the object, the contention ratio being a ratio of the number of contentious accesses to the total number of accesses, and the average waiting time being a ratio of the total waiting time to the number of contentious accesses; and
    switching the locking mode of the object to the multi-level locking mode responsive to determining the object is in the single-level locking mode, the contention ratio exceeds a first contention ratio threshold, and the average waiting time exceeds a first time threshold.

4. A method as claimed in claim 3, wherein switching the locking mode of the object to the multi-level locking mode comprises:
acquiring a write access right for the object;
activating the locks for the fields of the object;
modifying the locking state parameter to a value indicating the multi-level locking mode; and
releasing the write access right for the object.

5. A method as claimed in claim 1, wherein switching the locking mode of the object between the single-level locking mode and the multi-level locking mode based on the access information further comprises:
calculating a contention ratio and average waiting time of the object, the contention ratio being a ratio of the number of contentious accesses to the total number of accesses, and the average waiting time being a ratio of the total waiting time to the number of contentious accesses; and
switching the locking mode of the object to the single-level eking mode responsive to determining the object is in the multi-level locking mode, the contention ratio is lower than a second contention ratio threshold, and the average waiting time is lower than a second time threshold.

6. A method as claimed in claim 5, wherein switching the locking mode of the object to the single-level locking mode comprises:
acquiring a write access right for the object;
revoking the locks for the fields of the object;
modifying the locking state parameter to a value indicating the single-level locking mode; and
releasing the write access right for the object.

7. A method as claimed in claim 1, wherein switching the locking mode of the object between the single-level locking mode and the multi-level locking mode based on the access information is performed periodically or in response to occurrence of a predetermined event.

8. A system for switching a locking mode of an object in a multithread program, comprising:
an access monitor configured to acquire, during execution of the program, access information related to accesses to the object by a plurality of threads, wherein the object supports a single-level locking mode and a multi-level locking mode, the single-level locking mode is a mode capable of locking the object, and the multi-level locking mode is a mode capable of locking the object and fields in the object respectively, wherein the access information comprises a total number of accesses to the object by the plurality of threads, a number of contentious accesses to the object by the plurality of threads, and a total waiting time of the plurality of threads, the total waiting time being a sum of waiting time of the respective threads requesting to access the object from the time the respective threads start to wait because the object is locked to the time the respective threads obtain an access right for the object; and
a locking mode controller configured to switch the locking mode of the object between the single-level locking mode and the multi-level locking mode based on the access information.

9. A system as claimed in claim 8, wherein the object is an object labeled in advance in the multi-thread program.

10. A system as claimed in claim 8, wherein the locking mode controller is configured to switch the locking mode of the object between the single-level locking mode and the multi-level locking mode based on the access information by:
calculating a contention ratio and average waiting time of the object, the contention ratio being a ratio of the number of contentious accesses to the total number of accesses, and the average waiting time being a ratio of the total waiting time to the number of contentious accesses, and
switching the locking mode of the object to the multi-level locking mode responsive to determining the object is in the single-level locking mode, the contention ratio exceeds a first contention ratio threshold, and the average waiting time exceeds a first time threshold.

11. A system as claimed in claim 10, wherein the locking mode controller is configured to switch the locking mode of the object to the multi-level locking mode by:
acquiring a write access right for the object;
activating the locks for the fields of the object;
modifying the locking state parameter to a value indicating the multi-level locking mode; and
releasing the write access right for the object.

12. A system as claimed in claim 8, wherein the locking mode controller is configured to switch the locking mode of the object between the single-level locking mode and the multi-level locking mode based on the access information by:
calculating a contention ratio and average waiting time of the object, the contention ratio being a ratio of the number of contentious accesses to the total number of accesses, and the average waiting time being a ratio of the total waiting time to the number of contentious accesses; and
switching the locking mode of the object to the single-level locking mode responsive to determining the object is in the multi-level locking mode, the contention ratio is lower than a second contention ratio threshold, and the average waiting time is lower than a second time threshold.

13. A system as claimed in claim 12, wherein the locking mode controller is configured to switch the locking mode of the object to the single-level locking mode by:
acquiring a write access right for the object;
revoking the locks for the fields of the object;
modifying the locking state parameter to a value indicating the single-level locking mode; and
releasing the write access right for the object.

14. A computer program product comprising a computer readable storage medium having a computer readable program stored therein, wherein the computer readable program, when executed on a computing device, causes the computing device to:
acquire, during execution of a multi-thread program, access information elated to accesses to an object by a plurality of threads, wherein the object supports a single-level locking mode and a multi-level locking mode, the single-level locking mode is a mode capable of locking the object, and the multi-level locking mode is a mode capable of locking the object and fields in the object respectively, wherein the access information comprises a total number of accesses to the object by the plurality of threads, a number of contentious accesses to the object by the plurality of threads, and a total waiting time of the plurality of threads the total waiting time being a sum of waiting time of the respective threads requesting to access the object from the time the respective threads start to wait because the object is locked to the time the respective reads obtain an access right for the object; and switching the locking mode of the object between the single level locking mode and the multi-level locking mode based on the access information.

15. A computer program product as claimed in claim 14, when the object is an object labeled in advance in the multi-thread program.

16. A computer program product as claimed in claim 14, wherein switching the locking mode of the object between the single-level locking mode and the multi-level locking mode based on the access information comprises:

calculating a contention ratio and average waiting time of the object, the contention ratio being a ratio of the number of contentious accesses to the total number of accesses, and the average waiting time being a ratio of the total waiting time to the number of contentious accesses; and switching the locking mode of the object to the multi-level locking mode responsive to determining the object is in the single-level locking mode, the contention ratio exceeds a first contention ratio threshold, and the average waiting time exceeds a first time threshold.

17. A computer program product as claimed in claim 16, wherein switching the locking mode of the object to the multi-level locking mode comprises:

acquiring a write access right for the object;
activating the locks for the fields of the object;
modifying the locking state parameter to a value indicating the multi-level locking mode; and
releasing the write access right for the object.

18. A computer program product as claimed in claim 14, wherein switching the locking mode of the object between the single-level locking mode and the multi-level locking mode based on the access information further comprises:

calculating a contention ratio and average waiting time of the object, the contention ratio being a ratio of the number of contentious accesses to the total number of accesses, and the average waiting time being a ratio of the total waiting time to the number of contentious accesses; and switching the locking mode of the object to the single-level locking mode responsive to determining the object is in the multi-level locking mode, the contention ratio is lower than a second contention ratio threshold, and the average waiting time is lower than a second time threshold.

19. A computer program product as claimed in claim 18, wherein switching the locking mode of the object to the single-level locking mode comprises:

acquiring a write access right for the object;
revoking the locks for the fields of the object;
modifying the locking state parameter to a value indicating the single-level locking mode; and
releasing the write access right for the object.

20. A computer program product as claimed in claim 14, wherein switching the locking mode of the object between the single-level locking mode and the multi-level locking mode based on the access information is performed periodically or in response to occurrence of a predetermined event.

* * * * *